(12) United States Patent
Tang et al.

(10) Patent No.: US 7,769,284 B2
(45) Date of Patent: Aug. 3, 2010

(54) LENS BARREL ASSEMBLY FOR A CAMERA

(75) Inventors: Tony K. Tang, Glendale, CA (US); Jing Xu, Irvine, CA (US); Roman C. Gutierrez, Arcadia, CA (US)

(73) Assignee: Silmpel Corporation, Arcadia, CA (US)

( * ) Notice: Subject to any disclaimer, the term of this patent is extended or adjusted under 35 U.S.C. 154(b) by 680 days.

(21) Appl. No.: 11/565,518

(22) Filed: Nov. 30, 2006

(65) Prior Publication Data

US 2008/0044172 A1    Feb. 21, 2008

Related U.S. Application Data

(63) Continuation-in-part of application No. 11/361,608, filed on Feb. 24, 2006, and a continuation-in-part of application No. 11/268,849, filed on Nov. 8, 2005, and a continuation-in-part of application No. 11/269,304, filed on Nov. 8, 2005, now Pat. No. 7,555,210.

(60) Provisional application No. 60/657,261, filed on Feb. 28, 2005.

(51) Int. Cl.
*G01B 3/00* (2006.01)
*G01B 13/00* (2006.01)

(52) U.S. Cl. .................................... 396/89; 359/823

(58) Field of Classification Search .................. None
See application file for complete search history.

(56) References Cited

U.S. PATENT DOCUMENTS

2005/0249487 A1 * 11/2005 Gutierrez ................ 396/85
2006/0054782 A1 *  3/2006 Olsen et al. ............. 250/208.1

\* cited by examiner

*Primary Examiner*—Jay M Patidar
(74) *Attorney, Agent, or Firm*—Haynes and Boone, LLP

(57) ABSTRACT

A lens barren assembly for a camera is disclosed. The lens barrel assembly comprises a lens barrel, at least one optical element disposed within the lens barrel, and an actuator configured to move the optical element. The actuator can be disposed entirely or partially within the lens barrel. The actuator can be a MEMS actuator, such as a MEMS actuator that is formed at least partially of silicon. The optical element can be a lens.

10 Claims, 2 Drawing Sheets

LENS BARREL ASSEMBLY FOR A CAMERA

CROSS-REFERENCE TO RELATED APPLICATIONS

This patent application is a continuation in part of, and claims the benefit of the priority date of U.S. patent application Ser. No. 11/361,608, filed Feb. 24, 2006 and entitled AUTOFOCUS CAMERA, hereby incorporated by reference, which claims benefit of U.S. Provisional Application No. 60/657,261, filed Feb. 28, 2005, and is a continuation in part of U.S. application Ser. Nos. 11/268,849 and 11/269,304 (now U.S. Pat. No. 7,555,210, issued Jun. 30, 2009), both of which were filed Nov. 8, 2005 and claim benefit of U.S. Provisional Application No. 60/657,261, filed Feb. 28, 2005.

BACKGROUND

1. Field of Invention

This invention generally relates to miniature cameras.

2. Related Art

Miniature cameras are currently available with many electronic devices, such as cellular telephones, laptop computers, personal digital assistants (PDAs), and the like. Miniature cameras are also available as stand-alone devices for applications such as security and surveillance The market for miniature cameras is rapidly expanding. For example, camera-equipped cell phones were unheard of just a few years ago; now, they are a significant portion of the cell phone market. However, available miniature cameras may not be optimal for some applications.

For example, available miniature cameras may not be optimal because they are fixed focus cameras (i.e., the focus of the cameras is pre-set). By using a relatively small aperture, the depth of field is sufficient to provide acceptable focus over a wide range of distances. However, the provided focus may be unacceptable for some applications. Additionally, the relatively small aperture limits the light used to form the image. This limitation may severely limit the camera's use in low light conditions.

Some miniature cameras use a flash to enhance camera performance in low light conditions. However, the use of a flash consumes more power from the batteries, thus requiring more frequent battery charging.

SUMMARY

A lens barrel assembly for a camera is disclosed. The lens barrel assembly can comprise a lens barrel, at least one optical element disposed within the lens barrel; and an actuator configured to move the optical element. The actuator can be disposed either entirely or partially within the lens barrel and being comprised of silicon.

The optical element can be any desired type of optical element. For example, the optical element can be a lens, a shutter, an adjustable aperture, a polarizer, a mirror, a prism, a filter, or a diffraction grating. The optical element can be any desired combination of elements. For example, the optical element can be a plurality of lenses.

The actuator can comprise a MEMS actuator. The actuator can be comprised of silicon. For example, the actuator can comprise a comb type silicon MEMS actuator.

The lens barrel can be configured so as to mitigate transmission of extraneous light to a detector. For example, the lens barrel can comprise a tubular structure within which the optical element and the actuator are mounted.

More particularly, according to an example of an embodiment of the present invention, an optical system can comprise an optical assembly holder body including a plurality of mounting features sized and positioned to engage a plurality of optical system elements, the plurality of mounting features including stage mounting features to position at least a portion of a miniature stage internal to the optical assembly holder body to selectively position one or more optical elements in the optical assembly holder body with respect to the optical assembly holder body.

The plurality of mounting features can comprise a plurality of shutter mounting features configured so as to position at least a portion of a shutter system. The optical system can further include the shutter system. The shutter system can include an actuator engaged with the shutter mounting features, and can further include a shutter blade positioned in a light-receiving portion of the holder body.

A miniature stage can engage with the stage mounting features and be positioned at least partially in the holder body. A moveable lens can be mounted on the miniature stage and positioned in the holder body.

A controller can be in communication with the miniature stage and can be configured to position at least the moveable lens to implement at least one function from the group consisting of autofocus, zoom, and image stabilization.

A first lens can be mounted in the holder body and can be positioned at a first end portion of the holder body to receive imaging light. An imager system can be positioned at a second end portion of the holder body opposite the first end portion. The first lens and the imager system can substantially block dust from entering the holder body. The holder body can have an included volume of about 400 cubic millimeters or less.

According to an example of an embodiment of the present invention, a mobile electronic device, such as a miniature camera, can comprise an optical assembly holder body, a miniature stage engaged with mounting features of the holder body and positioned at least partially in the holder body, and an optical element positioned on the miniature stage and within the optical assembly holder body.

One or more embodiments of the present invention can comprise a mobile security device, a cell phone, a mobile computing device, and a personal digital assistant.

According to an example of an embodiment of the present invention, a method of producing a miniature camera, comprises providing a holder body comprising a plurality of mounting features sized and positioned to engage a plurality of optical system elements. The plurality of mounting features can include a stage mounting features to position at least a portion of a miniature stage having an optical element mounted thereon. The portion of the miniature stage can be engaged with the stage mounting features so that the optical element is positioned in the holder body.

Prior to engaging the portion of the miniature stage with the stage mounting features a first lens can be positioned in the holder body, a baffle can be positioned in the holder body so that a first side of the baffle is positioned proximate the first lens, and/or a second lens can be positioned in the holder body so that the second lens is proximate a second opposite side of the baffle.

At least a portion of a shutter system can be engaged with mounting features of the holder body. At least a portion of an imaging system can be engaged with mounting features of the holder body.

An example of an embodiment of the present invention can comprise a lens barrel assembly for a camera, wherein the lens barrel assembly comprises a lens barrel, at least one optical element disposed within the lens barrel, and an actuator configured to move the optical element. The actuator can be disposed at least partially within the lens barrel and can be comprised of silicon. The actuator can be a MEMS actuator. The actuator can be a piezo-electric actuator. The actuator can be a voice-coil actuator.

The optical element can be a lens. The actuator can be disposed completely within the lens barrel. The lens barrel can be configured so as to mitigate transmission of extraneous light to a detector. For example, the lens barrel can comprise a tubular structure.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Systems and techniques provided herein may be used for small and high quality miniature cameras. The cameras may provide advanced functionality such as auto-focus (AF), zoom, image stability, and the like. The cameras may be stand-alone devices, or may be included as part of multi-function devices such as cell phones, personal digital assistants, or other devices.

Some existing camera systems provide auto-focus, shutter capability, and/or optical zoom. However, these functions are implemented using a relatively large lens system. For example, in one example of an existing camera system, auto-focus functionality is provided by moving the entire lens barrel over a distance of about 300 microns. Moving this relatively large mass over a relatively large distance requires sufficiently large stages and actuators.

Further, two windows are generally needed for dust sealing. Since optical performance can be compromised by the presence of dust or other particles, sealing the lens systems from the external environment is important. However, using two windows increases both the size and the cost of the camera. Currently, the most compact widely available camera with auto-focus (without shutter or zoom) measures about 10×10×6.7 mm.

By contrast, embodiments described herein allow for a size reduction to about 8×8×5 mm or less (about half the volume), even when shutter and/or zoom functionality are incorporated.

In commonly assigned U.S. patent application Ser. No. 11/219,410, filed on Sep. 2, 2005, which is hereby incorporated by reference in its entirety, systems and techniques for moving one or more individual lenses with respect to the lens barrel are described.

Figure 1:
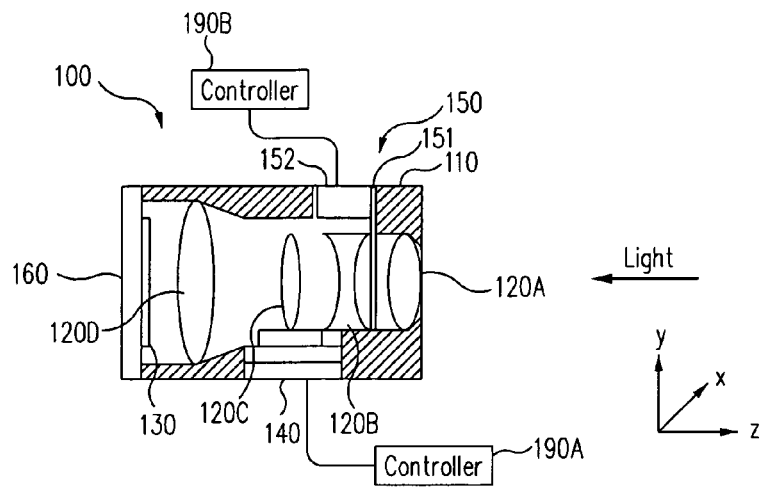
FIG. 1 is a cross-sectional side view of an optical system, according to some embodiments.

The current disclosure allows for movement of one or more optical elements positioned in the lens barrel with respect to other optical elements and/or with respect to the lens barrel itself. FIG. 1 shows a cross-sectional view of a lens system 100, according to some embodiments.

System 100 includes a holder body such as lens barrel body 110, which may be a plastic injection molded part. Lens barrel body 110 is configured and sized to position and align other components of system 100. For example, lens barrel body 110 may include mounting features sized and configured to engage with and position a plurality of optical system elements such as a miniature stage, one or more fixed lenses, shutter system elements, and the like. Although FIG. 1 illustrates lens barrel body 110 as a single piece, it need not be.

System 100 further includes a plurality of lenses such as lenses 120A, 120B, 120C, and 120D. For a fixed focus miniature camera, each of the lenses may be fixed (directly or indirectly) to lens barrel body 110. For a miniature camera providing enhanced functions, such as auto-focus, zoom, image stabilization, or the like, at least one of the lenses is moveable. In system 100, lens 120C is positioned on a microelectromechanical systems (MEMS) stage 140, and may be moved by applying a force to stage 140 using one or more actuators. A controller 190A may provide positioning information to an actuator of stage 140, where the positioning information is indicative of a target position for stage 140 (e.g., a target position corresponding to a desired focus condition, etc.) The positioning information may comprise positioning data and/or a signal indicating the desired position of stage 140.

System 100 may further include one or more baffles (not shown). Baffles may be provided in lens barrel body 110 between lenses, and positioned to block stray light from an imager 130.

System 100 may further provide physical shuttering capability using a shutter system 150 including a shutter 151 and an actuator 152. Shutter 151 may be located behind lens 120A, and may be positioned to block light incoming from lens 120A or allow the light to pass. A controller 190B (which may be at least partially integrated with controller 190A, or may be separate) is configured to control shuttering.

As noted above, system 100 may implement at least one of auto-focus, image stabilization, shutter, and zoom functions. Auto-focus is an important feature for miniature cameras. Many available miniature cameras (such as most cameras found in cell phones) are fixed focus cameras. Although fixed focus is sufficient for some uses, the image quality is poor for others.

System 100 may implement auto-focus as follows. Lenses 120A, 120B, and 120D are fixed to lens barrel body 110. In order to mount the lenses accurately, lens barrel body 110 is fabricated so that portions of its inner diameter are precisely matched to the outer diameter of one or more associated lenses. In the example of FIG. 1, when lenses 120A, 120B, and 120D are inserted in lens barrel body 110, they are precisely aligned by the mounting features of lens barrel body 110. Alignment of the lenses is important for obtaining good image quality. For example, lens barrel body 110 may be fabricated within tolerances that allow for lenses 120A, 120B, and 120D to be centered with respect to each other with an accuracy of about ±1 micron to about ±20 microns.

Lens 120C is aligned to the other lenses by properly positioning stage 140. For example, stage 140 may be abutted to a portion of lens barrel body 110 in a way that provides intimate contact. Prior to installation of stage 140 and lens 120C in lens barrel body 110, lens 120C is aligned to stage 140 using lens alignment features, such as those described in U.S. patent application Ser. No. 11/364,100, filed on Feb. 28, 2006, which is hereby incorporated by reference in its entirety.

Many different configurations of stage 140 may be used. For example, stage 140 may be configured to provide translation in one or more of the x, y, and z directions. In some embodiments, the stage may be oriented differently than shown; for example, it may be orthogonal to the z-axis, where the motion of the lens is still substantially in the z-axis. Additionally, stage 140 may have multiple parts, so that more than one optical element may be positioned in lens barrel body 110.

System 100 may be incorporated in a miniature camera configured to receive a signal indicating that the miniature camera should obtain an image (e.g., a miniature camera in which a user may press a button to indicate the start of image acquisition). In response to the signal, a position of lens 120C may be determined that corresponds to a desired focus condition, based on objects in the field of view of the camera. A signal may be generated to drive the actuator of stage 140 so that lens 120C is moved to the proper position. One exemplary method for generating signals to quickly and accurately move stage 140 to a desired position is described in United States Patent Application Attorney Docket Number M-16129 US, Ser. No. 11/485,812, filed on Jul. 12, 2006, which is hereby incorporated by reference in its entirety.

Using system 100, stage 140 need only move lens 120C on the order of 40 microns to change focus from infinity to 10 cm. This is substantially less than the 300 micron movement used in some available systems, where the entire lens barrel is moved to focus. The reduced travel is highly desirable and is a result of moving a lens inside the lens barrel. That is, using the systems and techniques herein allows stage 140 to be positioned substantially (or completely) within the confines of lens barrel body 110. As a result, substantial size improvements may be obtained with the current systems and techniques.

System 100 may be configured to provide image stabilization, in addition to other features such as auto-focus. In order to implement image stabilization functionality, stage 140 may be configured to move lens 120C in the x- and y-directions (where auto-focus is implemented by moving lens 120C in the z-direction). By moving lens 120C along the x-axis and/or the y-axis, the position of the image may be shifted with respect to imager 130 with little affect on focus.

As a result, movement of lens 120C in other degrees of freedom may allow for optical image stabilization. The motion of the camera may be sensed with, e.g., inertial rotation sensors. The signal from the sensors may be processed to determine the motion of lens 120C that will counteract the motion of the camera to stabilize the image. The processed signal may then be provided to the actuator(s) of stage 140, which positions lens 120C accordingly.

System 100 may also implement shuttering functionality. As shown in FIG. 1, a shutter system 150 includes at least one shutter element 151 and at least one actuator 152 to apply a force (linear force and/or torque) to a portion of shutter system 150 to position shutter element 151. Shutter element 151 is positioned between lens 120A and lens 120B to substantially block light from entering the other constituents of the optical system or to allow light to pass.

System 100 may also implement zoom functionality. For example, one or more additional lenses may be provided that can be positioned in or out of the optical path of system 100. For example, shutter system 150 may have an additional lens that can be flipped in and out of the optical path. Systems and techniques for implementing zoom are described in pending U.S. patent application Ser. No. 11/263,152, filed on Oct. 31, 2005, which is hereby incorporated by reference in its entirety.

Lens barrel body 110 can have any desired shape. For example, it can be configured to be round, square, or octagonal in transverse cross-section. Typically, it will be light tight, so as to inhibit the transmission of extraneous light to a detector. Threads 161 or other mounting features can be formed upon lens barrel body 110 to facilitate attachment of lens barrel body 110 to a lens mount 162 or other structure. Threads 161 or other mounting features can be used to facilitate adjustment in the positioning of lens barrel body 110, such as with respect to a sensor.

Figure 2A:
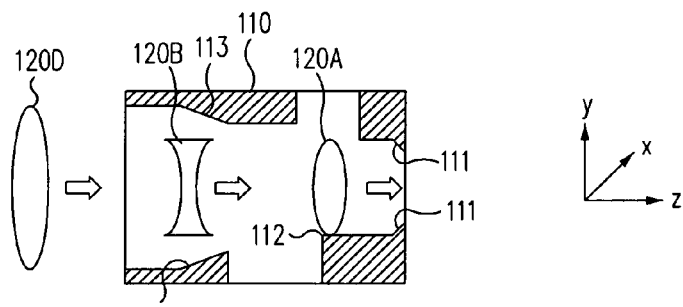
FIGS. 2A to 2C illustrates a method of assembling an optical system such as that shown in FIG. 1, according to some embodiments.
Figure 2B:
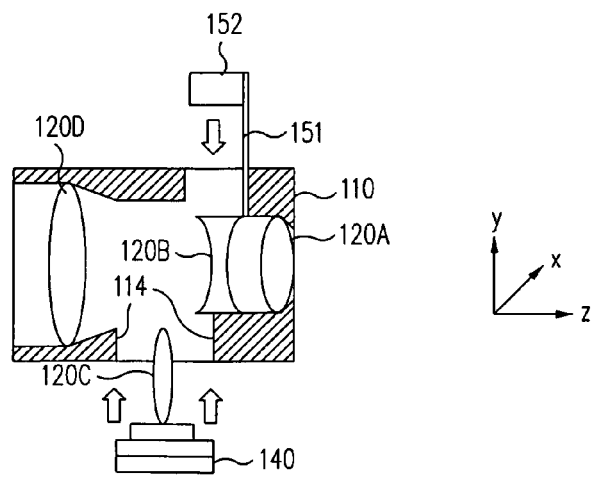
Figure 2C:
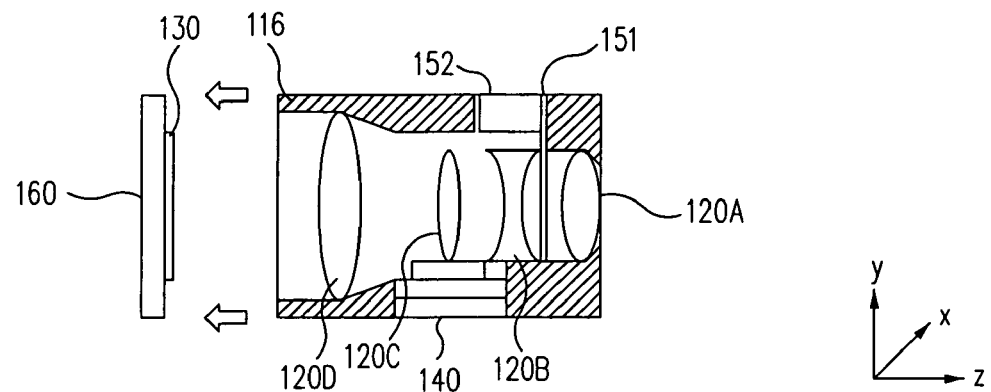

FIGS. 2A to 2C illustrate a method that may be used to assemble a lens assembly such as the lens assembly illustrated in FIG. 1.

FIG. 2A illustrates assembly of three of the lenses in the lens holder, which is similar to a process used to assemble state-of-the-art lens barrel assemblies for cell phone cameras. First, lens barrel body 110 is provided. Lens 120A is dropped into lens barrel body 110 and pressed into mounting features 111 formed therein, which are shaped and configured to position lens 120A appropriately.

A baffle (not shown) is dropped on top of lens 120A. Lens 120B is dropped on top of the baffle and pressed into mounting features 112 formed in lens barrel body 110 configured to position lens 120B appropriately. A plastic spacer (not shown) is then dropped on top of lens 120B. Lens 120D is dropped on top of the plastic spacer and pressed into mounting features 113 formed in lens barrel body 110 configured to position lens 120D appropriately. Glue is then applied to secure lens 120D in position, which also secures the other elements as well.

FIG. 2B illustrates the second part of the assembly process. A MEMS shutter blade 151 and actuator 152 are inserted into lens barrel body 110 through a slot in its side. The positioning of the shutter is generally not critical, so the alignment can be referenced either to shutter blade 151 (for relatively high precision) or actuator body 152 (relatively low precision). Shutter blade 151 and actuator 152 may be secured in place using epoxy, or using mounting features with snap-in functionality.

During this portion of the assembly process, stage 140 and lens 120C mounted thereon are inserted into lens barrel body 110, engaging mounting features 114. For some applications, the alignment of stage 140 and lens 120C are extremely critical. The alignment may be accomplished in different ways. For example, stage 140 may be referenced to lens barrel body 110 and secured in place using epoxy, or by implementing mounting features 114 as snap mounting features. In another example, stage 140 can be referenced to the lenses that are already inserted into lens barrel body 110 (e.g., lenses 120B and 120D). In this technique, lens 120C is referenced to stage 140, which in turn is referenced directly to lens 120B and 120D. This technique may be more precise than referencing stage 140 to lens barrel body 110.

FIG. 2C shows a third portion of the assembly process. Lens barrel body 110 includes a skirt portion 116 that protrudes beyond lens 120D. Skirt portion 116 may be generally rectangular in shape and serve as mounting features for imager 130 on PCB 160. Skirt portion 116 provides a seal around imager 130 when lens barrel body 110 is glued to PCB 160. This provides a very important function, since imager 130 is very sensitive to dust or other contaminant materials. For example, for an implementation in which imager 130 is configured to provide a three micron pixel size, a five micron particle that falls on the surface of imager 130 can make several pixels dark. This may provide an unacceptable image for many applications.

Other embodiments may be used; for example, imager 130 may be a chip scaled package, where the window is mounted directly to the imager chip according to chip scale packaging methods for imagers, using known techniques. For such an embodiment, the housing rather than the imager is used to align the lenses to imager 130 and to seal the lenses.

Figure 3:
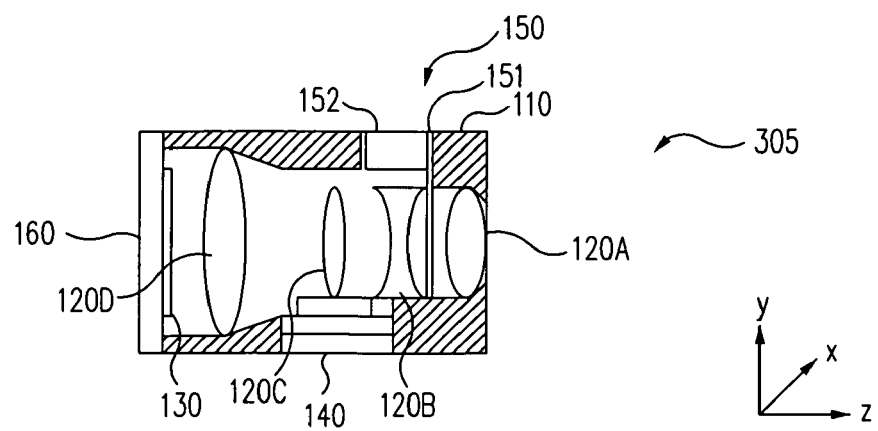
FIG. 3 is a schematic diagram of an electronic device including an optical system such as that shown in FIG. 1, according to some embodiments.

A lens barrel body and complete assembly such as the example shown in FIG. 1 may be included in an electronic device such as device 305 of FIG. 3. Device 305 may comprise a miniature camera, and may provide further functionality (e.g., it may be a miniature camera included as part of a device that provides multiple functions).

Miniature camera systems may be used in fixed or mobile devices, which may have only camera functionality or may be multi-function devices.

For example, miniature cameras may be provided as part of fixed security systems (e.g., mounted to a structure in a fixed position). Alternately, miniature cameras may be integrated with mobile devices, such as mobile security systems (e.g., a camera in a common household item not mounted in a fixed position). Other well-known examples of mobile devices include cell phones, laptop computers, and personal digital assistants (PDAs).

In the implementation of FIG. 3, device 305 includes a miniature camera configured for advanced functionality such as auto-focus, image stabilization, zoom, shuttering, or the like. As noted above, lens barrel body 110 includes features for positioning a plurality of lenses in the optical path of imaging light received at a light receiving end of lens barrel body 110.

Although FIG. 3 illustrates a device 305 with a miniature camera having advanced functionality, the systems and techniques described herein may be used with other configurations, such as devices with fixed focus miniature cameras. Additionally, different lens configurations are possible.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A lens barrel assembly for a camera, the lens barrel assembly comprising:
   a lens barrel;
   at least one optical element disposed within the lens barrel;
   an actuator configured to move the optical element, the actuator being disposed at least partially within the lens barrel and being comprised of silicon; and,
   a shutter system at least partially disposed in the lens barrel and operable to selectably block or allow the passage of light within the lens barrel.

2. The lens barrel assembly as recited in claim 1, wherein the optical element is a lens.

3. The lens barrel assembly as recited in claim 1, wherein the actuator is disposed completely within the lens barrel.

4. The lens barrel assembly as recited in claim 1, wherein the actuator comprises a MEMS actuator.

5. The lens barrel assembly as recited in claim 1, wherein the actuator comprises a piezoelectric actuator.

6. The lens barrel assembly as recited in claim 1, wherein the actuator comprises a piezoelectric actuator and the piezoelectric actuator moves a single lens.

7. The lens barrel assembly as recited in claim 1, wherein the actuator comprises a voice coil actuator.

8. The lens barrel assembly as recited in claim 1, wherein the actuator comprises a voice coil actuator and the voice coil actuator moves a single lens.

9. The lens barrel assembly as recited in claim 1, wherein the lens barrel is configured so as to mitigate transmission of extraneous light to an imager disposed within the lens barrel.

10. The lens barrel assembly as recited in claim 1, wherein the lens barrel comprises a tubular structure.

* * * * *

UNITED STATES PATENT AND TRADEMARK OFFICE
CERTIFICATE OF CORRECTION

PATENT NO. : 7,769,284 B2 Page 1 of 1
APPLICATION NO. : 11/565518
DATED : August 3, 2010
INVENTOR(S) : Tony K. Tang, Jing Xu and Roman C. Gutierrez It is certified that error appears in the above-identified patent and that said Letters Patent is hereby corrected as shown below:

On the cover page, item (73) Assignee: delete "Silmpel Corporation" and insert --Siimpel Corporation--.

Col. 1, in the section CROSS-REFERENCE TO RELATED APPLICATIONS and immediately prior to the section BACKGROUND, insert the following paragraphs:

--This patent application is also a continuation-in-part of and claims the benefit of the priority date of United States Patent Application No. 11/078,667 (now United States Patent No. 7,477,842 issued January 13, 2009) filed March 11, 2005 and entitled MINIATURE CAMERA, which claims the benefit of the priority date of United States Provisional Patent Application No. 60/552,521 filed March 12, 2004 and entitled MINIATURE CAMERA.

This patent application is also a continuation-in-part of and claims the benefit of the priority date of United States Patent Application No. 11/268,849 (now United States Patent No. 7,646,969 issued January 12, 2010) filed November 8, 2005 and entitled AXIAL SNUBBERS FOR CAMERA, which claims the benefit of the priority date of United States Provisional Patent Application No. 60/657,261 filed February 28, 2005 and entitled MINIATURE CAMERA.--

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,769,284 B2 | Page 1 of 1 |
| APPLICATION NO. | : 11/565518 | |
| DATED | : August 3, 2010 | |
| INVENTOR(S) | : Tony K. Tang et al. | |

It is certified that error appears in the above-identified patent and that said Letters Patent is hereby corrected as shown below:

This certificate supersedes the Certificate of Correction issued November 9, 2010. The certificate is vacated since "Petition to accept unintentionally delayed claim for 35 U.S.C. 120; Benefit of a prior Application(s) under 37 CFR 1.78(a)(3)" has not been granted by the office of PCT Legal Administration. The Certificate of Correction should not have been issued for this patent.

Signed and Sealed this
Twenty-second Day of February, 2011

David J. Kappos
*Director of the United States Patent and Trademark Office*

UNITED STATES PATENT AND TRADEMARK OFFICE
CERTIFICATE OF CORRECTION

PATENT NO. : 7,769,284 B2
APPLICATION NO. : 11/565518
DATED : August 3, 2010
INVENTOR(S) : Tony K. Tang, Jing Xu and Roman C. Gutierrez It is certified that error appears in the above-identified patent and that said Letters Patent is hereby corrected as shown below:

In the section CROSS-REFERENCE TO RELATED APPLICATIONS and immediately prior to the section BACKGROUND, insert the following paragraphs:

-- This patent application is also a continuation-in-part of and claims the benefit of the priority date of United States Patent Application No. 11/078,667 (now United States Patent No. 7,477,842 issued January 13, 2009) filed March 11, 2005 and entitled MINIATURE CAMERA.

This patent application is also a continuation-in-part of and claims the benefit of the priority date of United States Patent Application No. 11/268,849 (now United States Patent No. 7,646,969 issued January 12, 2010) filed November 8, 2005 and entitled CAMERA SNUBBER ASSEMBLY. --

Signed and Sealed this
Sixteenth Day of August, 2011

David J. Kappos
*Director of the United States Patent and Trademark Office*